US012699510B2

(12) United States Patent
Wilmer

(10) Patent No.: US 12,699,510 B2
(45) Date of Patent: Aug. 4, 2026

(54) METHOD FOR EFFICIENTLY STORING DATA

(71) Applicant: MERCEDES-BENZ GROUP AG, Stuttgart (DE)

(72) Inventor: Thorsten Wilmer, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/287,217

(22) PCT Filed: Apr. 8, 2022

(86) PCT No.: PCT/EP2022/059360
§ 371 (c)(1),
(2) Date: Oct. 17, 2023

(87) PCT Pub. No.: WO2022/223313
PCT Pub. Date: Oct. 27, 2022

(65) Prior Publication Data
US 2024/0370165 A1      Nov. 7, 2024

(30) Foreign Application Priority Data

Apr. 20, 2021    (DE) ..................... 10 2021 002 079.0

(51) Int. Cl.
*G06F 3/06* (2006.01)
(52) U.S. Cl.
CPC .......... *G06F 3/0608* (2013.01); *G06F 3/0659* (2013.01); *G06F 3/0679* (2013.01)
(58) Field of Classification Search
CPC ..... G06F 3/0659; G06F 3/0679; G06F 3/0608

USPC ......................................................... 711/154
See application file for complete search history.

(56) References Cited

U.S. PATENT DOCUMENTS

| | | | | |
|---|---|---|---|---|
| 9,898,225 | B2 | 2/2018 | Vijayan et al. | |
| 9,946,533 | B2 | 4/2018 | Bainville et al. | |
| 2002/0165961 | A1* | 11/2002 | Everdell | H04L 47/125 709/225 |
| 2008/0126672 | A1* | 5/2008 | Ljung | G11C 16/105 711/E12.008 |

(Continued)

FOREIGN PATENT DOCUMENTS

| | | |
|---|---|---|
| CN | 101196824 A | 6/2008 |
| CN | 102591675 A | 7/2012 |

(Continued)

OTHER PUBLICATIONS

International Search Report and Written Opinion mailed Aug. 9, 2022 in related/corresponding International Application No. PCT/EP2022/059360.

(Continued)

*Primary Examiner* — Gautam Sain
(74) *Attorney, Agent, or Firm* — PATENT PORTFOLIO BUILDERS PLLC

(57) ABSTRACT

A method for efficiently storing data in a physical data memory involves comparing new data with already stored old data or a copy thereof. Only the non-matching data portions of the comparison are transmitted to the data memory and stored therein. The data stored in the data memory are addressed via a memory management in such a manner that the new data and the old data jointly use common data portions at the same physical storage location.

10 Claims, 2 Drawing Sheets

(56)                    References Cited

U.S. PATENT DOCUMENTS

| | | | |
|---|---|---|---|
| 2011/0125962 A1* | 5/2011 | Nimura | G01C 21/3859 |
| | | | 711/E12.019 |
| 2011/0173604 A1 | 7/2011 | Nakamura et al. | |
| 2017/0090902 A1 | 3/2017 | Bainville et al. | |
| 2017/0090903 A1* | 3/2017 | Bainville | G06F 8/71 |
| 2018/0060349 A1* | 3/2018 | Wilmer | G06F 16/178 |
| 2019/0179625 A1 | 6/2019 | Rosner et al. | |
| 2021/0072977 A1* | 3/2021 | Giri | G06F 8/63 |
| 2021/0157578 A1* | 5/2021 | Lee | G06F 12/0246 |

FOREIGN PATENT DOCUMENTS

| | | |
|---|---|---|
| CN | 103250134 A | 8/2013 |
| JP | 2009048557 A | 3/2009 |

OTHER PUBLICATIONS

Office Action created Oct. 18, 2021 in related/corresponding DE Application No. 10 2021 002 079.0.
Xia et al.; "A Comprehensive Study of the Past, Present, and Future of Data Deduplication;" Proceedings of the IEEE; Sep. 2016; pp. 1681-1710; vol. 104, Issue: 9.
Office Action dated Apr. 30, 2026 in related/corresponding CN Application No. 202280029252.X.
Zhang Jialin et al., "Design and Implementation of Software Simulation MMU for Low-to-Mid-End Microprocessor Platforms," Jul. 7, 2014, Computer Disc Software and Applications, vol. 17, No. 6, pp. 67-70.

* cited by examiner

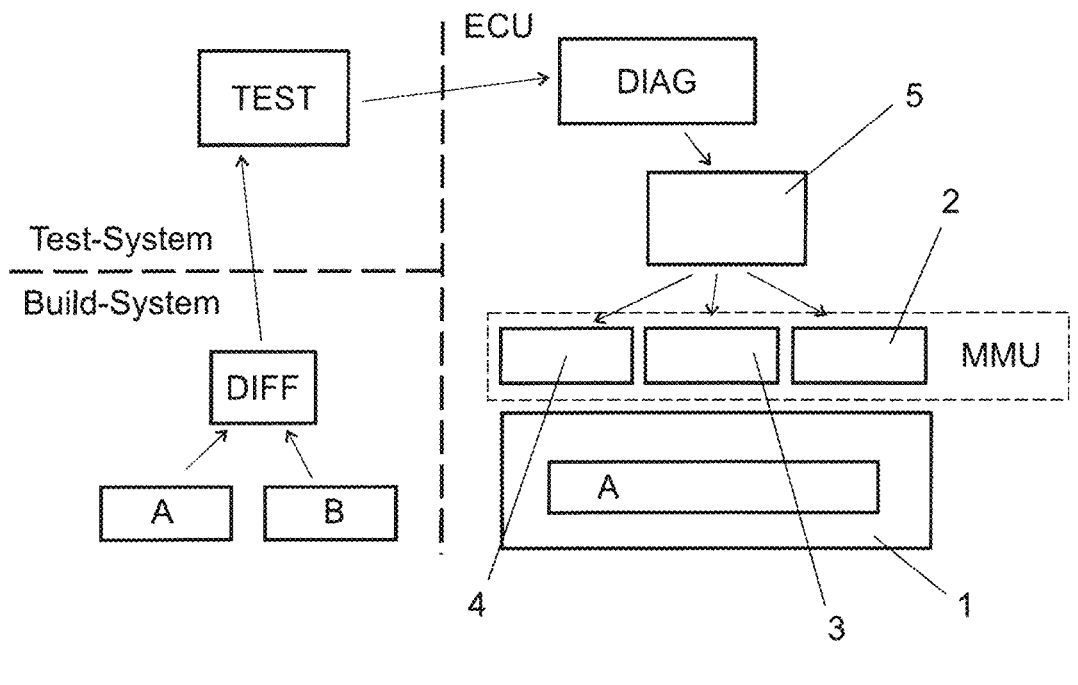
_Fig. 1_
_Fig. 2_

METHOD FOR EFFICIENTLY STORING DATA

BACKGROUND AND SUMMARY OF THE INVENTION

Exemplary embodiments of the invention relate to a method for efficiently storing data in a physical data memory.

When storing data in a physical data memory, the individual data are stored in the form of pages or segments, which are referred to below as data portions, in different areas of the physical memory. If, for example, software in a flash memory is to receive an update, it is typically necessary to install the new software version B in the memory in the case of a running software version A, in order to then be able to start with the new software version B, for example, during the next system start. In practice, a physical memory having the size of the two software versions A and B is therefore always necessary since the latter must be installed in parallel at least in phases on the physical memory.

There are methods for increasing efficiency for the transmission of the data to the memory. For example, US 2011/0173604 A1 describes that only the difference between two software versions, i.e., the data portions in which the two versions differ, must accordingly be transmitted since the portions in which the software is identical are already present in the memory and can accordingly be shifted or copied.

Regarding the further general prior art, reference can also be made in this context to U.S. Pat. No. 9,946,533 B2.

The object of the present invention is to specify a method for efficiently storing data in a physical data memory, in which very good use of the existing storage space is possible.

In a manner comparable to the prior art mentioned in the introduction, new data are compared with already stored old data in order to transmit non-matching data portions of the comparison to the data memory and store the portions therein. A transmission of identical data portions can thus be dispensed with.

According to the invention, it is now such that the data stored in the data memory are addressed via a memory management unit, a so-called MMU (Memory Management Unit), such that the new data and the old data use common data portions, which thus match both in the old and in the new data, at the same physical storage location. The MMU then shows a corresponding image of the respective data, for example, of an executable software, which image corresponds to the expected data structure, to a system using the physical memory, for example, a processor. In fact, the image can however result from a mixture of new data and old data, which is quasi-translated into the expected image by the MMU. In this case, identical data portions are present at the same physical storage location and are thus present only once in the memory. It thus becomes possible to use the storage space very efficiently since different images can jointly access the same common data portions via the MMU.

The method according to the invention can be used efficiently, in particular, for software updates in a flash memory. In principle, however, it can also be transferred to all other types of data that have at least partially matching data portions, and can be applied to all types of memories, i.e., for example, also hard drives or the like. Nevertheless, the explanations and descriptions of the method according to the invention take place primarily on the basis of the example of software updates in flash memories.

By the joint usage according to the invention of identical data portions at the same physical storage location, which is managed accordingly by the MMU, it is now possible to simultaneously install and operate two versions of software on a flash memory, even if this flash memory with one version of the software is already more than half full. Thus, for example, a flash memory with 32 Gbits can include a software version A of 20 Gbits and a software version B of 21 Gbits, both of which are executable since they jointly use common data portions and thus do not require 41 Gbits of storage space in total but, for example, only 31 Gbits. This results in a very decisive advantage with respect to the storage space, which constitutes a decisive advantage in particular in the case of flash memories in systems integrated on a chip, so-called SoCs.

The data portions can, in particular, comprise pages or segments. The current consideration with pages includes a structure of the so-called software image of several pages. The latter can then be compared to one another prior to loading a software update or, in the most general sense, new data. Identical pages are then not transmitted again, which saves transmission bandwidth, and are not stored again but are jointly used by several images, which enables the above-described effect of exceptionally efficient utilization of the physical memory with the aid of the MMU. In this case, the size of the pages is determined according to the hardware components, wherein typical page sizes in practice are between 4 kbits and 64 Mbits.

Alternatively, a data portion can also be formed by a so-called data segment. Such data segments, as are known and customary especially in older systems, can in this context be dynamically adapted in terms of their size based on the data contents. The method thus enables greater flexibility since, for example, several successive identical pages in one old and one new image can be combined to form a data segment, which then becomes easier with regard to the handling in the MMU but causes slightly more effort when the corresponding data packet for loading the new image is created.

According to a very advantageous development of the invention, the MMU itself can be designed as software. Such a software solution for the MMU is always conceivable and possible in principle and is thus largely independent of the system. This can be a decisive advantage, especially with regard to the flexibility of the systems. The integration can preferably take place in the software of an SoC.

Alternatively, it would also be conceivable to integrate the MMU into the hardware. Such an integration into the hardware is fast and efficient. As one possibility in this respect, the MMU could simply be integrated into the hardware controller of the NAND memory when a NAND flash memory is used. This is accordingly simple and efficient. In other types of memory, such as NOR memories, the MMU would then have to be initialized by an initial boot on the software side. As mentioned, it can alternatively also be developed entirely as a software system.

Further advantageous embodiments of the method according to the invention also result from the exemplary embodiment, which is shown in more detail below with reference to the figures and on the basis of the example of software updates in a flash memory.

BRIEF DESCRIPTION OF THE DRAWING FIGURES

In the figures:

FIG. 1 shows a schematic overview of the components involved;

FIG. 2 shows a schematic view of the corresponding images of different software versions at different points in time and the data actually present in the flash memory.

DETAILED DESCRIPTION

Figure 3:
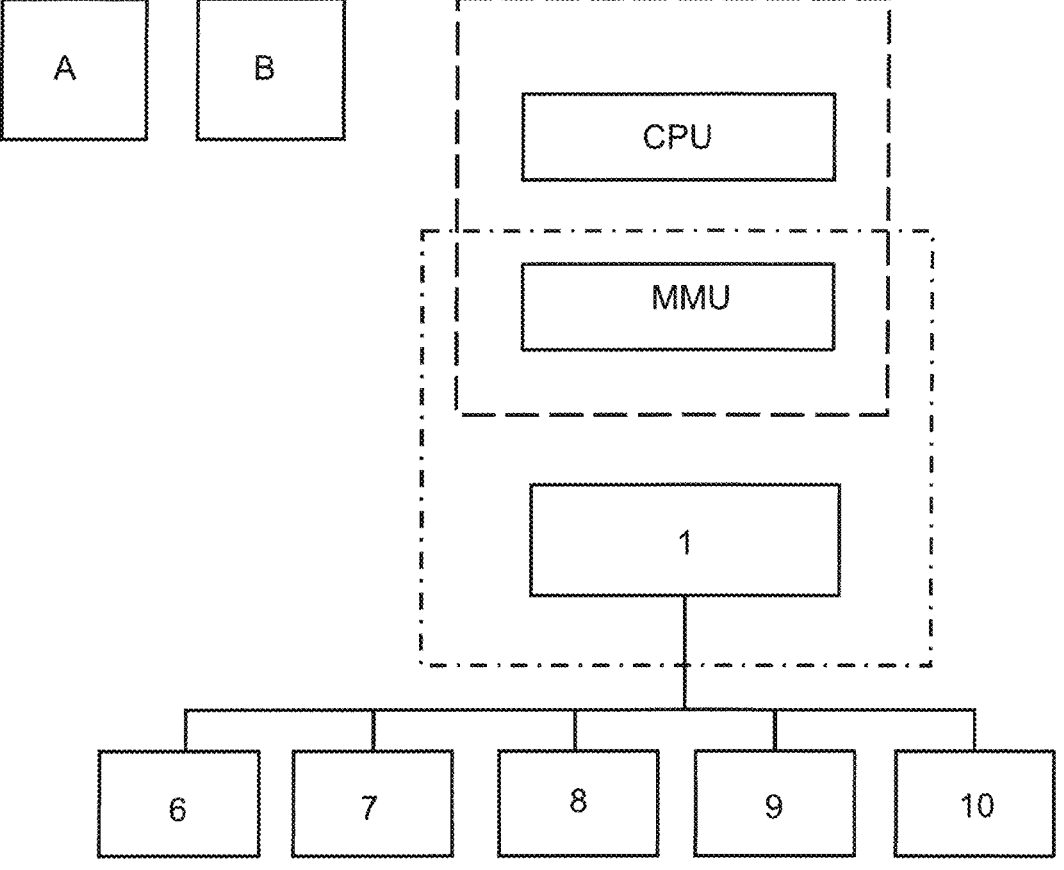
FIG. 3 shows an exemplary system structure.

The aim of a method for efficiently using existing physical memory is to provide immediate switching between different data, in particular software versions, and to simultaneously realize a memory over-occupancy by jointly using data portions, for example, pages or segments. The method can, for example, be used for a vehicle control system. Software updates in the background are to be made possible in the control systems. In this case, it should be possible to have a software version that uses more than 50 percent of the existing memory, wherein an update and a restart of the system with the new software should nonetheless be possible. In this case, as little data as possible should have to be transmitted and written in order to make the system slim and fast.

For example, a software image A and a software image B, which functions as an update of software image A, are now provided. Both image A and image B are compiled and/or built such that identical portions are at the same location within each image as much as possible. This is, for example, possible because, if the image A is a file system, only new files are written, or a linking loader (linker), in the arrangement of the portions, also takes into account the portions of the old image accordingly and appends anything that does not fit at the previous position according to the old image, to the end of the new software image. The linker then produces a code that is independent of the position and corresponding entry points for the functions of the software, wherein jumps to the functions can take place, for example, via a jump table at the end of the image.

In the representation of FIG. 1, the two exemplary software images A, B are represented accordingly in a build system at the bottom left by the two blocks denoted by A and B. They are now processed, as is indicated by the arrows, in order to generate a data stream from the two images via a difference tool denoted by DIFF, which data stream is then to be transmitted later to the target, for example, a control unit ECU shown in the representation of FIG. 1 on the right of a dashed line. The software download is then performed accordingly on this ECU system and the data stream is interpreted accordingly. The ECU system can be designed as a system on a chip (SoC). It comprises a memory management unit MMU, which is arranged between the physical memory 1, for example, a flash memory, on one side and the image of the particular software image used by the process, on the other side. This can be applied, for example, to XIP (Execute In Place) code for a NOR flash, which is indicated in FIG. 1 with the box 2. For a NAND flash, the translation is determined either in the firmware of the NAND controller by the host (box 3) or, if there is no hardware support, the MMU is used as a software translation layer according to the box 4.

In the representation of FIG. 1, the software passes from the build system shown at the bottom left to a test system arranged above it with a tester TEST, and then into the actual ECU system on the right side of the representation. A diagnosis takes place in a box denoted by DIAG. The actual software download is then forwarded to the next level by the box denoted by 5. Here, either a software flash translation 4 on the software side or a NAND flash translation 3 on the hardware side or a hardware-implemented MMU 2 can be present. The MMU then communicates accordingly with the actual flash memory 1, which is realized as hardware and can be designed, for example, as a NAND, as a NOR or also as a combination of these two types of flash memory. Within the flash memory, the previous content of the flash memory, namely the software image A, is then stored accordingly in the box A.

The individual data portions, which are processed in this case, can, for example, be pages with a page size that is fixedly adapted to the hardware. Just as well, dynamic segments can serve as data portions, which are filtered and processed in accordance with their differences in the formation of the software updates.

In the representation of FIG. 2, four different versions or points in time of the software are shown in four columns, wherein the image of the respective software is at the top, as the processor sees it, and the actual physical storage in the physical memory 1 of the flash is shown underneath. In between, the MMU is indicated by the double arrows.

In the far left column, the software image A can be seen, in which the current image and the content of the flash memory 1 correspond to one another. In comparison with previous versions, the base image (hatched) and various differences are already present here, which are described here with delta a, delta b and delta c. The free memory of the flash 1 is shown cross-hatched. The software image B in the column to the right thereof differs in that the previous difference delta b continues to be used, whereas the differences delta a and delta c do not. Instead, further differences delta 1, delta 2 and delta 3 come into effect in the new software image B. Via the build system, it is now ensured that only the contents delta 1, delta 2, and delta 3 have to be transmitted in the software update together with the information that delta b continues to be used and delta a and delta c are accordingly omitted. If the new software image B is now written into the flash memory, the MMU appends these differences delta 1, delta 2 and delta 3 to the previous content so that they are written into the free memory. The processor now sees the image B shown in the upper row, while the corresponding pages or data portions are actually arranged at different locations in the flash memory 1.

The software image A with its three differences from a possible previous software image can comprise, for example, a size of 20 GBytes and can now be written in addition to the software version B with a volume of, for example, 21 GBytes into the flash memory 1, which is only 32 GBytes in total since the common contents, like the base software image A, which is indicated hatched here, and the remaining difference delta b are now jointly used by the two software versions Ab, B. At this point in time, both software images are then present so that either version A or version B can selectively be used.

If a further software update C now comes into effect, the area for delta a and delta c can accordingly be released in a state denoted here by B', which is shown accordingly in the third column from the left, so that new free areas now arise in the flash memory because it can be assumed that the software version A no longer needs to be used after the software update C has been installed. In principle, the differences could also be appended at the bottom so that earlier versions are overwritten only if no more storage space is available otherwise, so that the oldest still existing differences would then in each case be overwritten with each new update.

Here, it is now such that the difference between the version B and the version C is that a new difference of delta x is added and the previous difference delta 3 is no longer used. The MMU now writes the difference delta x into the area which has become free by the deletion of the difference delta a and in turn marks the difference delta 3 as no longer necessary for the current version, so that the latter can accordingly be deleted when additional storage space is needed, for example in a further update.

At the point in time shown in columns A, B, the two software versions, which together have a size of 41 GBytes, can then be stored accordingly in the flash memory of a size of 32 GBytes and used in parallel so that very efficient use of the memory with an over-occupancy is possible here since software versions with more than 40 GBytes are virtually located in the memory of a size of only 32 GBytes. At the points in time B' and C shown in the two right columns, this similarly applies to the software versions B and C, wherein the difference delta x is written into one of the locations that have become free.

In the case of all software updates, only a minimal effort in respect of the transmission of data and the writing of new data is necessary. This makes the system simple and fast and also makes it possible to use the memory exceptionally efficiently by over-occupancy. For this purpose, the difference tool DIF generates a data stream, which is subsequently in a test system, as can be seen in the representation in FIG. 1, and is then transmitted via a diagnostic interface DIAG to the software download component 5. The software download component 5 now uses at least one of the flash transition layers 2, 3, 4 of the MMU to access the actual flash memory 1. The rest of the software of the processor also accesses the flash 1 by the same flash transition layer 2, 3, 4 and accordingly sees the image as originally generated in the original before it passed through the difference tool DIFF.

To create the data stream in the difference tool DIFF, the longest common data portions, such as sub-sequences, per byte are calculated for the new image. This problem can be calculated with various known problems in $O(n^2 \log(n))$. As a by-product, it is then known for each byte where the longest sequence exists in the original data. As a further optimization, the new image is processed stepwise and portions of the new image are also considered as "old" image in each step, which makes it possible to generate references to the new image up to this point. The creation of the data by the difference tool DIFF differs depending on whether the target system, for example, the ECU according to FIG. 1, has the MMU (Memory Management Unit) in the SoC or in the NAND or whether the flash 1 is imaged segmentally by the software.

The case of the ECU having an MMU is described first.

Now, a cyclic redundancy check (CRC) is in each case calculated for each page for the input image and output image. In the case of data portions, for example, pages, that have an identical CRC, the pages are compared in order to ensure that they are really identical. For these identical new pages, it is noted in which old pages the contents can be found. In this step, it is also checked whether there are sufficient free pages in the flash 1, i.e., the sum of the identical pages, the old non-identical pages and the new non-identical pages must be less than or at most equal to the pages of the flash 1.

If there are not enough free pages, a boot loader must traditionally be used, which is additionally located in the flash 1 and writes the new image to the flash. In this case, the image is simply transmitted in compressed form and conventionally installed. Otherwise, it is calculated for the remaining pages where the longest identical byte sequence for which byte sequence is found in the original image. In this case, sequences shorter than approximately 20 bytes are discarded and the bytes are marked as new in order for the difference image not to have portions that are too small.

In a further step, the commands that the target system must execute are now encoded, for which purpose page after page of the new image is processed. The commands are numbered and are in each case generated and executed in accordance with the instruction from the target system by the memory mapping operation of the (MMU) and write operations into the flash 1. The MMU configuration is permanently stored in the target in one or more pages of the flash 1. The mapping may also be implemented in software of the SoC or in the firmware of the NAND flash or as parts of the flash 1 formed as a NAND flash, instead of in the MMU.

1. New page is identical to an old page:
   Operation: map(oldPage, newPage)
   Output 1<32 bit oldPage><new virtual page number>
2. New page is not identical
   Operation: allocatePage
   Output 0<new virtual page number>
   a. Sequence of identical data
      Output 0, offset in the old image or already written pages, length
   b. Sequence of new data
      Output 1, 16-bit number, length of new data, the new data The command stream is then compressed in blocks, as is suitable for the data transmission, in each case at a page boundary, with, for example, Izma or another lossless compression method. Each of these blocks is provided with a signature. The programming method can be restarted at each block boundary. By means of the virtual page numbers, it is known at which location the writing process must continue.

In the target system, in this case the ECU, the command stream is first decompressed. Then, according to the command stream, pages are mapped
 pages are allocated and rewritten
  with data from existing pages
  with new data This creates a new mapping table for the new image. If the system is now booted or a file system accesses it, the image can be read, as expected by the software, in one of the above-described embodiments 2, 3, 4 due to the MMU. Pages of the old image that are no longer referenced by the new image can be searched and, if the old image is to be deleted, these no longer referenced pages are marked as free, as described above and indicated in FIG. 2 by the dashed lettering delta a, delta c in the second column from the left and delta 3 in the far right column.

FIG. 3 shows an exemplary system structure. The two images A and B are again shown at the top on the left side. Next to them, the CPU and, underneath, the MMU are shown. The flash memory, which is again denoted by 1, can be seen underneath them. It may be designed as a NOR flash, as a NAND flash or as a combination thereof. In the case of a NAND flash, the MMU may, for example, be part of this flash 1, as is indicated by the dot-dashed line. In addition, the MMU could also be part of the SoC with the CPU, which is symbolized by the dashed line. The flash 1 itself then comprises the contents shown below it. The box denoted by 6 can represent a boot loader. The two boxes denoted by 7 and 8 represent the pages of the new and old image B, A, which can of course be located in the flash 1 in an order deviating from the arrangement in the image, as explained. The box denoted by 9 comprises the mapping of the pages, e.g., in a table. The box denoted by 10 is to symbolize further contents of the flash 1, which are however not further relevant to the method shown here, but which are typically present in the flash 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for efficiently storing data in a physical data memory, the method comprising:

storing, by a memory management unit of the physical data memory, a second software image comprising a base image and a plurality of differences from a first software image, wherein the physical data memory is a flash memory;

receiving, by the memory management unit, a third software image, wherein the third software image is an update of the second software image, and wherein the received third software image includes a plurality of differences from the second software image and at least one additional difference, wherein the at least one additional difference is one of the plurality of differences from the first software image;

transmitting, by the memory management unit, the plurality of differences from the second software image to the physical data memory;

storing, by the memory management unit, the third software image in the physical data memory by storing the plurality of differences from the second software image, which were transmitted by the memory management unit, in the physical data memory and maintaining the base image of the second software image and at least one of the plurality of differences from the first software image in a current location in the physical memory; and transmitting, by the memory management unit to a central processing unit external to the physical memory, a memory mapping of the third software image.

2. The method of claim 1, wherein the plurality of differences from a first software image and the plurality of differences from the second software image are pages.

3. The method of claim 1, wherein the plurality of differences from a first software image and the plurality of differences from the second software image are segments, wherein a size of the segments is dynamically adapted based on data contents of the segments.

4. The method of claim 1, wherein the plurality of differences from a first software image and the plurality of differences from the second software image are pages, wherein a size of the pages is specified based on hardware used.

5. The method of claim 1, wherein the memory management unit is software.

6. The method of claim 1, wherein the memory management unit is hardware.

7. The method of claim 1, further comprising:

accessing, by the central processing unit from the physical data memory via the memory management unit, the second and third software images; and simultaneously executing, by the central processing unit, the second and third software images.

8. The method of claim 1, wherein the storing of the third software image further comprises:

marking as free, by the memory management unit, locations in the physical data memory storing differences of the plurality of differences from the first software image other than the least one of the plurality of differences from the first software image.

9. The method of claim 1, further comprising:

creating, by the central processing unit, a new mapping table for the third software image based on the memory mapping of the third software image transmitted by the memory management unit.

10. The method of claim 9, wherein the mapping table includes virtual page numbers for accessing the third software image, the method further comprising:

receiving, by the memory management unit from the central processing unit, a request to access a portion of the third software image, wherein the portion of the third software image is identified in the request by a virtual page number of the virtual page numbers;

accessing, by the memory management unit from the physical data memory using a physical data memory location corresponding to the virtual page number, the portion of the third software image; and transmitting, from the memory management unit to the physical data memory, the requested portion of the third software image.

* * * * *